United States Patent [19]
Ping

[11] Patent Number: 6,151,452
[45] Date of Patent: Nov. 21, 2000

[54] CAMERA, SUCH AS AN APS CAMERA, HAVING A SINGLE-PIECE, ROTATABLE VIEWFINDER AND LIGHT-PIPE MASK FOR FORMAT SELECTION

[75] Inventor: Yeung Chi Ping, Sai Ying Pun, The Hong Kong Special Administrative Region of the People's Republic of China

[73] Assignee: Concord Camera Corp., Hollywood, Fla.

[21] Appl. No.: 09/291,340

[22] Filed: Apr. 14, 1999

[51] Int. Cl.[7] ............................. G03B 13/10; G03B 17/24
[52] U.S. Cl. ............................. 396/60; 396/315; 396/380
[58] Field of Search ........................... 396/6, 60, 378, 396/379, 380, 315–317

[56] References Cited

U.S. PATENT DOCUMENTS

| | | | |
|---|---|---|---|
| D. 325,741 | 4/1992 | Arai | D16/208 |
| 4,973,997 | 11/1990 | Harvey | 354/106 |
| 5,059,994 | 10/1991 | Harvey | 354/222 |
| 5,111,228 | 5/1992 | Hansen | 354/222 |
| 5,339,125 | 8/1994 | Fridman et al. | 354/106 |
| 5,430,517 | 7/1995 | Zander | 354/222 |
| 5,523,813 | 6/1996 | Manabe et al. | 354/94 |
| 5,592,252 | 1/1997 | Kobayashi et al. | 396/380 |
| 5,612,759 | 3/1997 | Smart et al. | 396/380 |
| 5,614,968 | 3/1997 | Miyasaka | 396/311 |
| 5,617,160 | 4/1997 | Stephenson, III et al. | 396/60 |
| 5,659,826 | 8/1997 | Kameyama | 396/378 |
| 5,659,827 | 8/1997 | Oshima | 396/380 |
| 5,678,081 | 10/1997 | Tanaka | 396/284 |
| 5,678,100 | 10/1997 | Nakamura | 396/435 |
| 5,689,733 | 11/1997 | Zawodny et al. | 396/6 |
| 5,689,743 | 11/1997 | Horning et al. | 396/316 |
| 5,710,618 | 1/1998 | McIntyre | 355/40 |
| 5,713,046 | 1/1998 | Kameyama et al. | 396/6 |
| 5,715,488 | 2/1998 | Sasaki et al. | 396/319 |
| 5,717,968 | 2/1998 | Stephenson, III et al. | 396/315 |
| 5,721,961 | 2/1998 | Kameyama | 396/6 |
| 5,721,973 | 2/1998 | Mizukawa | 396/73 |
| 5,721,987 | 2/1998 | Ozawa | 396/263 |
| 5,721,988 | 2/1998 | Iwai et al. | 396/277 |
| 5,734,929 | 3/1998 | Brogden et al. | 396/6 |
| 5,734,941 | 3/1998 | Teremy et al. | 396/315 |
| 5,740,479 | 4/1998 | Soma et al. | 396/176 |
| 5,740,483 | 4/1998 | Hashimoto et al. | 396/315 |
| 5,771,415 | 6/1998 | Matsumura et al. | 396/315 |
| 5,784,658 | 7/1998 | Hata et al. | 396/311 |
| 5,790,900 | 8/1998 | Katsura et al. | 396/6 |
| 5,805,934 | 9/1998 | Kamata | 396/6 |
| 5,815,760 | 9/1998 | Ito et al. | 396/543 |
| 5,819,126 | 10/1998 | Kitagawa et al. | 396/319 |
| 5,822,621 | 10/1998 | Szajewski | 396/6 |
| 5,828,914 | 10/1998 | Balling | 396/378 |
| 5,832,311 | 11/1998 | Zawodny et al. | 396/6 |
| 5,875,358 | 2/1999 | Yamaguchi | 396/6 |
| 5,892,993 | 4/1999 | Moriya | 396/317 |
| 5,950,025 | 9/1999 | Uchiyama et al. | 396/380 |
| 5,950,029 | 9/1999 | DeCecca et al. | 396/380 |

*Primary Examiner*—W. B. Perkey
*Attorney, Agent, or Firm*—Woodcock Washburn Kurtz Mackiewicz & Norris LLP

[57] ABSTRACT

A camera for making pseudo-photographic images has a series of viewfinder masks that define various fields of vision and a series of light-pipe masks that selectively block the passage of light through two light pipes disposed within the camera. The selective blockage causes various patterns of encodement marks to be placed on the edge of the camera's photographic film. The masks are rotatably disposed around the optical axis of the camera's picture-taking lens. The masks are manually rotated by the camera user via a lever and gear assembly disposed on the camera's front cover.

49 Claims, 5 Drawing Sheets

CAMERA, SUCH AS AN APS CAMERA, HAVING A SINGLE-PIECE, ROTATABLE VIEWFINDER AND LIGHT-PIPE MASK FOR FORMAT SELECTION

BACKGROUND OF THE INVENTION

Pseudo photography involves the production of images that display the photographic subject in various perspectives. Cameras utilized for pseudo photography are typically adapted to produce panoramic, high-vision, and classic, i.e., conventional full-frame, images. A specific type of image is generated by developing an exposed frame of photographic film in a particular manner. Cameras adapted for pseudo photography usually comprise some means for selectively masking the camera's viewfinder. This selective masking furnishes the camera user with a viewfinder image that approximates the image selected to appear on the finished photographic print.

So called "APS" (Advanced Photo System) film (also known as an "SSU film strip") is one type of film that has been adapted for pseudo photography. APS film is usually available in the form of an APS film cassette (also known as an "SSU film strip loaded cartridge"), and cameras that employ such cassettes are known as APS cameras. APS cameras typically have a selector switch for selecting the format, i.e., panoramic (P), classic (C), or high-vision (H), in which an exposure is to be developed.

Cameras employed in pseudo-photography, including APS cameras, typically comprise some mechanism by which a coded pattern of markings indicative of the selected format is placed on the edge of the film frame, away from the main photographic image. The marking pattern is utilized during the developing process as an indication of the type of image that the camera user desires to appear on the finished print. The marking pattern is usually produced by selectively exposing small areas on the film surface to natural (ambient) or artificial light.

Cameras which utilize ambient light to produce the coded marking patterns may comprise one or more light pipes. Light pipes convey ambient light to the film surface upon the opening of the camera's shutter. Masks are usually employed to selectively block one or both light pipes. This selective blockage produces the coded pattern that corresponds to the type of image selected for a particular frame of film.

APS cameras utilized for pseudo photography include low-cost, "single-use" cameras, i.e., cameras that are purchased with a pre-loaded film supply and are returned for development of the film at a later time. Single-use cameras and single-use APS cameras are well-known in the art (see U.S. Pat. Nos. 5,689,733 and 5,832,311, each of which is incorporated herein by reference its entirety). Simplicity of operation and low mechanical complexity are considered advantageous in low-cost, single-use cameras. Furthermore, compact external dimensions are considered a highly desirable quality in this type of camera.

Single-use cameras are usually made of plastic. Film is pre-loaded into a single-use camera during the camera's manufacturing process. The film-loading procedure is similar to that for a conventional 35 mm camera, i.e., the film is loaded from the rear of the camera, and some type of cover is then sealed in place. The rear cover of a single-use camera is typically sealed using adhesive, screws, thermal bonding, or some type of locking mechanism. Packaging, such as paper, cardboard, or plastic, is usually placed around the camera body so that the film cannot be removed without destroying at least part of the packaging and, in some cases, part of the camera. Furthermore, film cannot readily be reloaded into the sealed camera without at least partial destruction of the packaging or the camera.

Various means have been employed to integrate viewfinder and light-pipe masks in a manner that minimizes amount of internal camera volume consumed by the masks and their associated hardware. For example, U.S. Pat. No. 4,973,997 discloses a plate upon which a series of viewfinder masks are disposed in a co-linear arrangement. The plate translates laterally within the camera body, along a substantially straight line. This translation selectively brings the various viewfinder masks into alignment with the viewfinder. The plate further comprises "extension sections" of various widths. The extension sections translate linearly, and selectively cover two light pipes in a manner that produces a series of masking patterns on a frame of photographic film. The masking plate described in this patent is not disposed around the picture-taking lens of a camera.

U.S. Pat. No. 5,059,994 describes a circular plate comprising a plurality of viewfinder masks. The masks are selectively rotated into alignment with a viewfinder to define various fields of view for a camera user. The circular plate does not comprise light-pipe masks. Furthermore, the plate is rotated by way of a knob disposed in the center of the plate, thereby precluding the installation of the plate around the picture-taking lens of a camera.

A single masking-element disposed around the picture-taking lens offers the potential for significant reductions in the amount of internal camera volume needed to accommodate the masks, thereby leading to a camera of smaller overall dimensions. The present invention addresses this potential.

SUMMARY OF THE INVENTION

The invention provides a camera, such as a single-use APS camera, for making pseudo-photographic images on photographic film. The camera features a series of masks that define various fields of vision through the camera's viewfinder. Each field of vision corresponds to a particular type of pseudo-photographic image. The exemplary embodiment of the invention is adapted to produce classic, panoramic, and high-vision images. The camera also comprises a series of light-pipe masks that selectively block the passage of light through two light pipes disposed within the camera. This selective blockage causes a coded marking pattern to be imprinted on the edge of the exposed film frame. The coded pattern indicates the type of format chosen by the user to appear on the finished photographic print.

The viewfinder and light-pipe masks are disposed on a masking element. The masking element is rotatably disposed around the optical axis of the camera's picture-taking lens. The masking element is coupled to an actuating mechanism that allows the camera user to select the type of pseudo-photographic image that will appear on the developed print. The actuating mechanism is integrated into the camera's front cover. The selection of a particular type of image by way of the actuating mechanism causes the masking element to rotate. This rotation brings the viewfinder mask corresponding to the selected image into alignment with the viewfinder.

The light-pipe masks are disposed on the masking element in a manner that causes one or more of the masks to align with the camera's light pipes when a particular type of image is selected. The masks are positioned so as to form various masking patterns over the light pipes. These patterns produce the coded film markings that identify the type of image selected by the user to appear on the finished print.

BRIEF DESCRIPTION OF THE DRAWINGS

The foregoing summary, as well as the following detailed description of the preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF THE PREFERRED EMBODIMENTS

The present invention provides a camera, such as an APS camera, for use in pseudo-photography. A preferred embodiment of the invention is described in connection with a low-cost, single-use camera that is adapted to the production of panoramic, high-vision, and classic, i.e., conventional full-frame, photographs. The described embodiment of the invention is presented for exemplary purposes only. Accordingly, the invention should not be limited to the particular embodiment shown, as the invention can be applied to other types of cameras.

Figure 1:
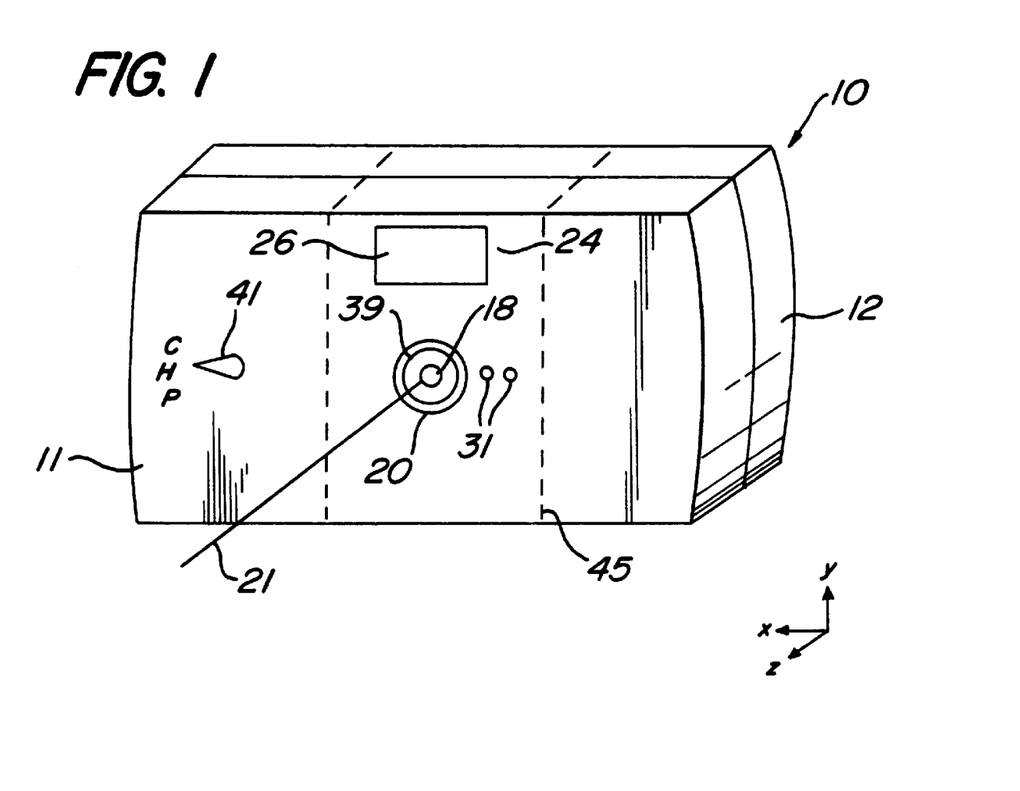
FIG. 1 is a front perspective view of a low-cost, single-use camera, such as a single-use APS camera, that is adapted to producing pseudo-photographic images in accordance with the present invention.
Figure 2:
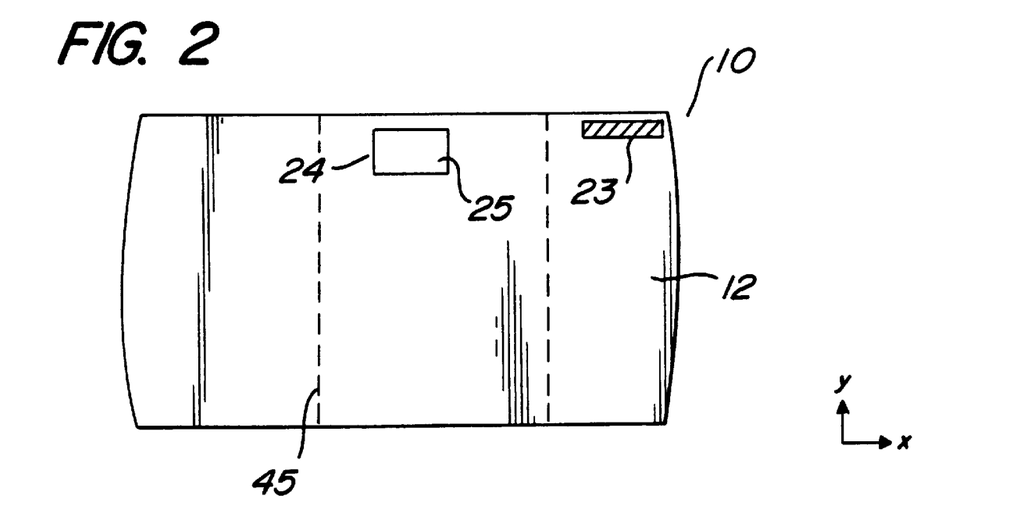
FIG. 2 is a rear view of the camera of FIG. 1.
Figure 3:
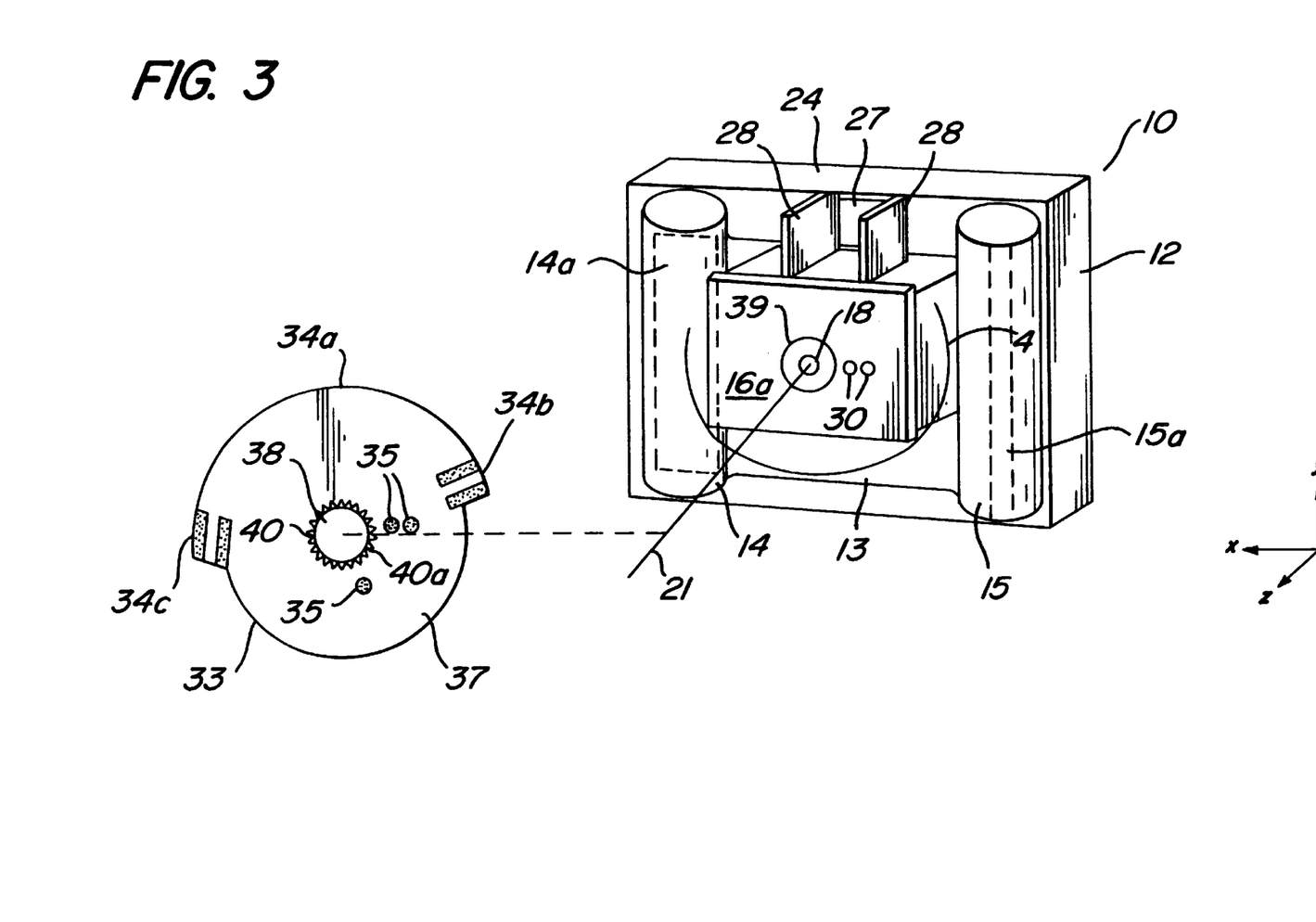
FIG. 3 is a front perspective view of the camera of FIG. 1 with the front cover of the camera removed.
Figure 4:
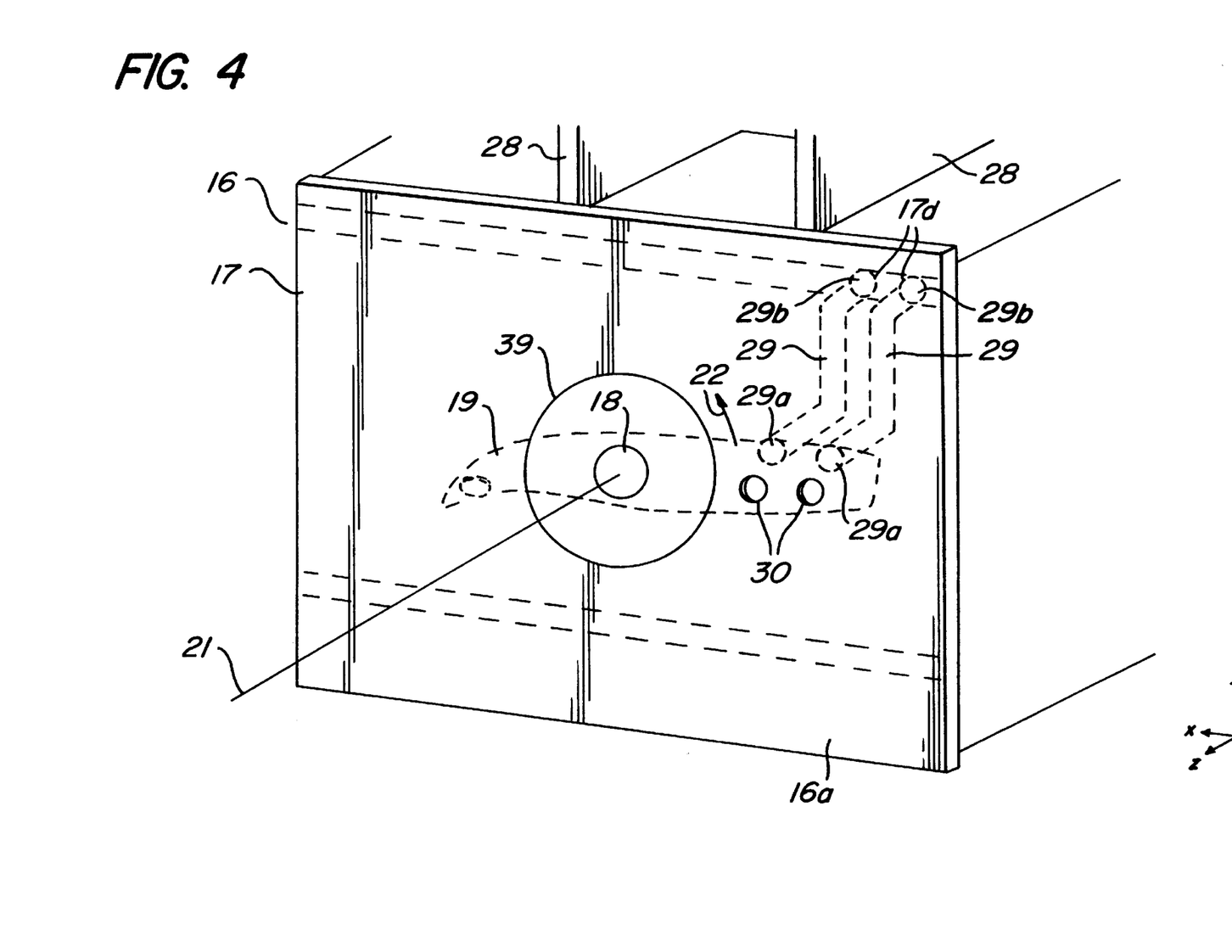
FIG. 4 is a close-up view of area 4 of FIG. 3.
Figure 5:
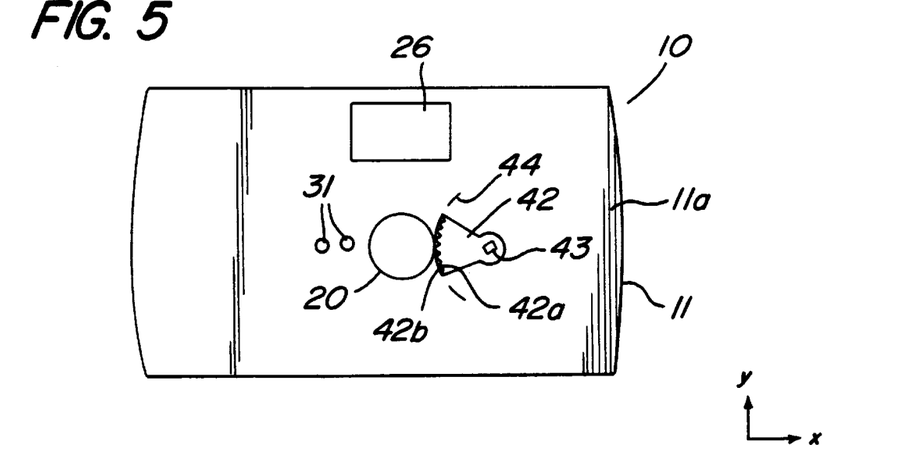
FIG. 5 is a rear view of an inner surface of the front cover of the camera of FIG. 1.
Figure 6:
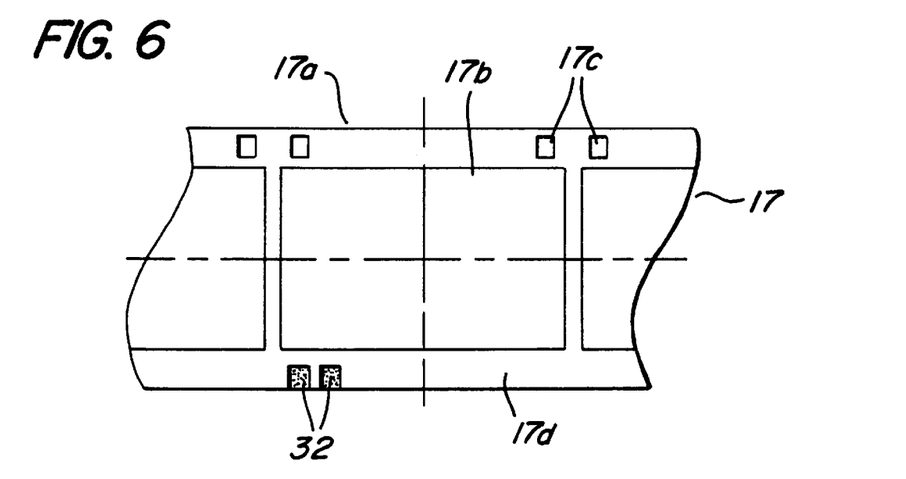
FIG. 6 is an illustration of a segment of an SSU film strip that may be employed with the camera of FIG. 1.

A preferred embodiment of the invention is illustrated in FIGS. 1 through 5. The embodiment comprises a camera 10. Camera 10 comprises a front cover 11, a rear cover 12, and a main body 13. Main body 13 is disposed within covers 11 and 12. Main body 13 comprises a film-cassette compartment 14, a film-spool compartment 15, and a lens/shutter housing 16. Film-cassette compartment 14 accommodates a cassette of unexposed film 14a (cassette 14a is shown in phantom in FIG. 3). Cassette 14a may be an APS film cassette comprising an SSU film strip 17. A segment of film strip 17 is illustrated in FIG. 6. Film strip 17 is drawn into and stored within film-spool compartment 15 after being exposed to ambient light in the manner described below. For purposes of simplicity, other portions of camera 10, such as a film drive, a film-advance mechanism, etc., have not been illustrated.

Camera 10 is a single-use camera as described in the background section above. Hence, covers 11 and 12 are securely fastened together using a technique such as adhesive, thermal bonding, screws, or a locking mechanism. Packaging 45 preferably surrounds at least a portion of covers 10 and 11. An outline of packaging 45 is illustrated in phantom in FIGS. 1 and 2. Packaging 45 can be formed from cardboard, adhesive-backed paper, or plastic. Packaging 45 may display operating instructions for camera 10. Packaging 45 may also contain indicia that points out various operating features of camera 10, e.g., the location of the shutter switch.

Preferably, packaging 45 must be removed or destroyed, at least in part, to remove film strip 17 from camera 10. Although single-use cameras typically can be recycled, reloading film in such a camera usually requires removal of the camera's rear cover. Hence, replacing film strip 17 in camera 10 requires destruction of a least a portion of packaging 45. Replacement of film strip 17 may also require destruction of at least a portion of covers 10 or 11, or main body 13, depending on the fastening method utilized to join the covers.

A picture-taking lens 18 and a shutter 19 are disposed in lens/shutter housing 16. Lens 18 is mounted along a forward section 16a of housing 16. Front cover 11 comprises an aperture 20 that allows ambient light to reach lens 18. Lens 18 defines an optical axis 21 ("optical axis 21" refers to an imaginary line about which lens 18 is symmetrically disposed in the manner shown in the figures). Lens 18 focuses ambient light onto a frame 17a on film strip 17. More particularly, ambient light is focused onto an image-exposure area 17b on frame 17a. Frame 17a is disposed between lens/shutter housing 16 and rear cover 12 during the exposure process. FIG. 6 illustrates the relative location of image-exposure area 17b on frame 17a.

Shutter 19 is illustrated in phantom in FIG. 4. Shutter 19 is biased in a "closed" position between lens 18 and film frame 17a (as shown in FIG. 4). Shutter 19 prevents ambient light from reaching frame 17a while in the closed position. Shutter 19 translates to an "open" position in which it no longer blocks the passage of ambient light, thereby exposing frame 17a by way of aperture 20 and lens 18. The direction of travel of shutter 19 is indicated by an arrow 22 shown in FIG. 4.

Frame 17a is manually drawn into film-spool compartment 15 after being exposed in the above-noted manner. More particularly, the portion of film strip 17 that contains the exposed frame is rolled onto a film spool 15a disposed in compartment 15 (spool 15a is shown in phantom in FIG. 3). Spool 15a is coupled to a hand-operated knob 23 disposed along rear cover 12. Movement of knob 23 rotates spool 15a. Rotation of spool 15a causes a pair of gears disposed on spool 15a to rotatably engage a series of perforations 17c located along the upper and lower edges of film strip 17. The engagement of perforations 17c rolls film strip 17 onto spool 15a. (The invention can also be employed in a camera in which the film is "pre-wound," i.e., a camera in which the unexposed film is wound onto spool 15a, and then drawn back into cassette 14a one frame at a time as each individual frame is exposed.)

Camera 10 further comprises a viewfinder 24. Viewfinder 24, in conjunction with a series of viewfinder masks, defines a field of view for the camera user. This field of view approximates the pseudo-photographic image selected by the user to appear on the developed photographic print (the image-selection process is described in detail below). Viewfinder 24 comprises an eye lens 25 mounted in rear cover 12. Viewfinder 24 also comprises a front lens 26 mounted in front cover 11. Ambient light reaches lens 25 by way of a passage 27 between lenses 25 and 26. Passage 27 is defined by an upper surface of lens/shutter housing 16, upper surfaces of covers 11 and 12, and two vertically-oriented projections 28 disposed along an upper surface of housing 16.

Camera 10 also comprises two light pipes 29. Light pipes 29 are disposed within lens/shutter housing 16, as illustrated in phantom in FIG. 4. Pipes 29 are tubular structures, such a fiber optic cables, that convey light from one end of the pipe to the other. A forward end 29a of each pipe is disposed proximate section 16a of lens/shutter housing 16. Section 16a comprises two apertures 30. Front cover 11 also comprises two apertures 31. Apertures 30 and 31 are substantially aligned with forward ends 29a of pipes 29, and thereby allow ambient light to reach pipes 29.

A rearward end 29b of each pipe 29 is disposed directly adjacent to a fiducial area 17d on film frame 17a. Fiducial area 17d is thus exposed to ambient light when such light is incident upon forward end 29a of pipe 29. This exposure produces a print aspect-ratio encodement mark 32 on area 17d. Area 17d is located along the lower edge of frame 17a, between perforations 17c. This location is denoted in FIG. 6.

A portion of shutter 19 is disposed in a location directly adjacent to forward pipe-ends 29a when shutter 19 is in the "closed" position. This configuration is shown in FIG. 4. Shutter 19 thus prevents ambient light from reaching pipes 29 when positioned in this manner. Shutter 19 translates away from ends 29a when shutter 19 moves to its "open" position. This translation exposes ends 29a, and thereby permits ambient light to reach pipes 29 if none of the camera's light-pipe masks (discussed below) are aligned with ends 29a.

Figure 7:
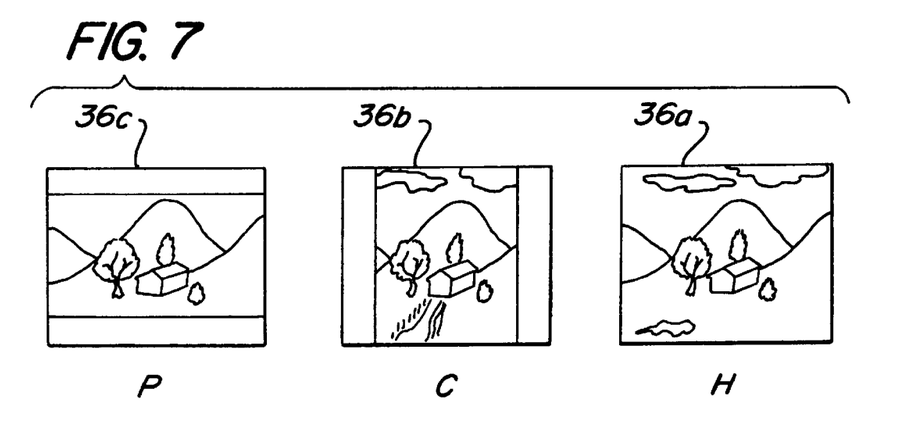
FIG. 7 is a series of exemplary representations showing the types of images that the camera of FIG. 1 is adapted to produce.

Camera 10 further comprises a masking element 33. Masking element 33 comprises a series of viewfinder masks 34 and a series of light-pipe masks 35. In the disclosed embodiment, masking element 33 comprises a high-vision mask 34a, a classic mask 34b, and a panoramic mask 34c. Masks 34 selectively block the passage of ambient light through certain segments of viewfinder 24. This selective blockage produces a field of view that approximates the pseudo-photographic image selected by the user to appear on the finished photographic print. FIG. 7 contains exemplary representations of a high-vision image 36a, a classic image 36b, and a panoramic image 36c.

Light-pipe masks 35 are selectively disposed between apertures 31 on front cover 11 and apertures 30 on lens/shutter housing 16. Masks 35 prevent ambient light from reaching pipes 29 when disposed in this manner. Masks 35 are positioned on masking element 33 so as to produce various patterns of encodement marks 32 on fiducial areas 17d of film frame 17a. Each encodement-mark pattern corresponds to a particular type of image which camera 10 is adapted to produce.

Masks 34 and 35 are disposed on a base 37. Base 37 is preferably formed from a rigid or semi-rigid transparent material. Masks 34 and 35 preferably comprise an opaque material that is adhesively attached to base 37. Alternatively, base 37 can be manufactured from an opaque material. Apertures may be disposed in the opaque base to allow ambient light to selectively reach viewfinder 24 and light-pipes 29.

Masking element 33 is rotatably disposed around optical axis 21 of lens 18. Masking element 33 is mounted by way of a circular aperture 38 disposed in the center region of base 37. Aperture 38 is positioned around a circular raised lip 39. Lip 39 is fixed to the forward-facing surface of section 16a of lens/shutter housing 16. Additionally, lip 39 is disposed around optical axis 21, i.e., optical axis 21 passes through a circle defined by lip 39. The diameter of aperture 38 is about equal to the outer diameter of lip 39. Lip 39 thus constrains masking element 33 from linear movement in the lateral ("x") and vertical ("y") directions, while allowing element 33 to rotate about optical axis 21.

A gear 40 is fixed to base 37 proximate the circumference of aperture 38. Gear 40 is rotatably disposed between front cover 11 and front section 16a of lens/shutter housing 16 (hence, a portion of masking element 33 is also disposed between cover 11 and section16a). Cover 11 and section 16a constrain gear 40 from any substantial movement in the axial ("z") direction. Masking element 33 is thus constrained from movement in the axial direction via gear 40. (The primary function of gear 40 is discussed below.)

Figure 8A:
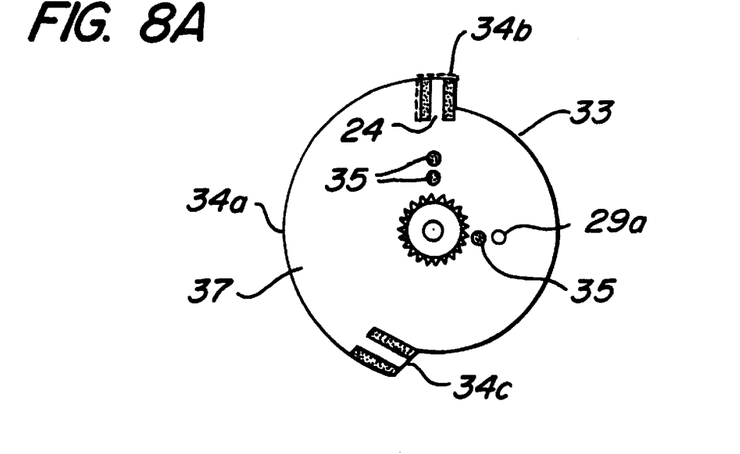
FIG. 8A is a front view of a masking element of the camera of FIG. 1 positioned in a "high-vision" setting.
Figure 8B:
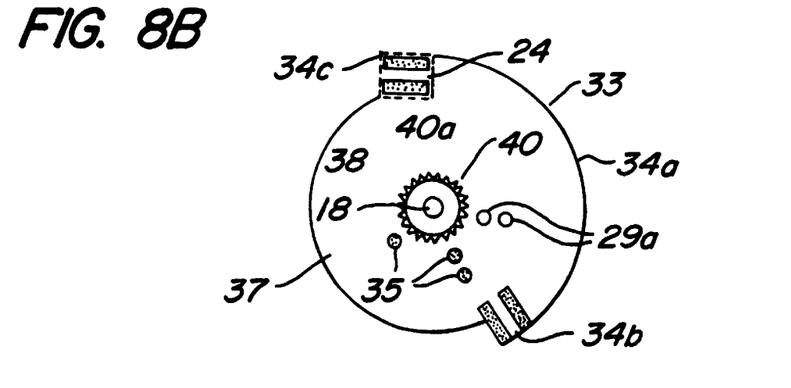
FIG. 8B is a front view of the masking element of FIG. 8A positioned in a "panoramic" setting.
Figure 8C:
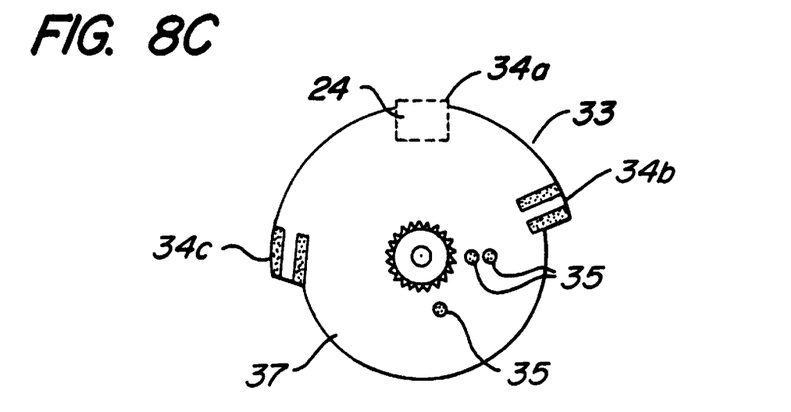
FIG. 8C is a front view of the masking element of FIG. 8A positioned in a "classic" setting.

Masks 34 and 35 are disposed on masking element 33 in the manner best shown in FIGS. 8A through 8C. Viewfinder mask 34b defines a field of vision corresponding to classic image 36b. Mask 34b defines this field when aligned with viewfinder 24, i.e., when mask 34b and viewfinder 24 are disposed in the positional relationship shown in FIG. 8A. Mask 34b produces this visual pattern by blocking the passage of ambient light through the side edges of viewfinder 24.

Mask 34c defines a field of vision corresponding to panoramic image 36c. Mask 34c defines a panoramic field by blocking the passage of light through the uppermost and lowermost portions of viewfinder 24. Mask 34c defines this pattern when aligned with viewfinder 24 in the manner shown in FIG. 8B.

Mask 34a does not block any light from passing through viewfinder 24, and thereby produces a field of vision corresponding to high-vision image 36a (the exemplary embodiment of masking element 33 thus contains no opaque material in the area designated as mask 34a). FIG. 8C shows the relative positions of masking element 33 and viewfinder 24 when a classic field is being displayed through viewfinder 24.

Masks 34 are selectively brought into alignment with viewfinder 24 by the rotation of masking element 33. Masking element 33 is rotated by way of a format-selector switch. In the exemplary embodiment, the format-selector switch comprises a lever 41 and a gear segment 42. Lever 41 is selectively disposed in one of three positions along the outer surface of front cover 11. These positions are labeled "C," "H," and "P," and correspond to classic image 36b, high-vision image 36a, and panoramic image 36c, respectively.

Lever 41 is coupled to gear segment 42. Gear segment 42 is disposed along an inner surface 11a of cover 11, as illustrated in FIG. 5. Lever 41 and segment 42 are coupled by way of a shaft 43 disposed on lever 41. Shaft 43 penetrates cover 11 by way of an aperture (not shown). Gear segment 42 comprises an outer circumference 42a. A plurality of teeth 42b are disposed along outer circumference 42a. Circumference 42a circumscribes an arc of about 90 degrees. Movement of lever 40 between each of its three positions causes shaft 43 to rotate, which results in a corresponding rotation of gear 42. The rotational motion of gear segment 42 drives outer circumference 42a and teeth 42b along an arc-shaped path 44.

Gear 40 of masking element 33 comprises a plurality of teeth 40a. Teeth 40a are disposed around an outer circumference of gear 40. Gear 40 and gear segment 42 are positioned in a manner that results in the engagement of teeth 40a and 42b. Movement of lever 41 thus imparts a rotational motion to masking element 33 by way of shaft 43, gear 40, and gear segment 42.

The correlative motion of lever 41 and masking element 33 is utilized to selectively align masks 34 and viewfinder 24 as follows. Placing lever 41 in the "high-vision" position causes gear 40 and gear segment 42 to assume a specific positional relationship. This relationship results in the alignment of high-vision mask 34a and viewfinder 24, as shown in FIG. 8B. Movement of lever 41 to the "classic" position causes outer circumference 42a of segment 42 to translate a specific distance along arc 44. This movement imparts a particular angular displacement to masking element 33 via gear 40. The displacement of masking element 33 brings classic mask 34b into alignment with viewfinder 24 (FIG. 8A).

Movement of lever 41 to the "panoramic" position causes outer circumference 42a to translate another specific distance along arc 44. This movement imparts a further angular displacement to masking element 33. The displacement of element 33 places panoramic mask 34c into alignment with viewfinder 24 (FIG. 8B). Movement of lever 41 back toward the "classic" or "high-vision" positions causes masking element 33 to rotate in the opposite direction. In the exemplary embodiment, masking element 33 rotates through an arc of about 110 degrees as it in travels between the "panoramic" and "classic" positions.

Light-pipe masks 35 are disposed on masking element 33 in a manner that causes fiducial areas 17d on film strip 17 to be exposed to specific patterns of ambient light. Each exposure pattern corresponds to a particular type of pseudo-photograph that camera 10 is adapted to produce. Masks 35 yield these exposure patterns by selectively blocking the passage of ambient light to pipes 29. Masks 35 perform this blocking function when aligned with forward ends 29a of light pipes 29.

Masks 35 and light-pipe ends 29a are selectively aligned by the rotation of masking element 33. Furthermore, the correlative motion of lever 41 and masking element 33 causes a specific set of masks 35 to align with light-pipe ends 29a when a particular type of pseudo-photograph is selected via lever 41. For example, two masks 35 are substantially aligned with light-pipe ends 29a when lever 41 is located in the "high-vision" position. This configuration is shown in FIG. 8C. The opening of shutter 19 under these circumstances thus allows ambient light to reach image-exposure area 17a, but not fiducial areas 17d. Hence, no encodement marks 32 will be placed on areas 17d. The equipment utilized during the subsequent development of film strip 17 will interpret the absence of encodement marks 32 as an indication that high-vision image 36a should be produced from that particular frame 17a.

Movement of lever 41 to the "classic" position causes masking element 33 to rotate into a position in which one light-pipe mask 35 aligns with one light pipe 29 (FIG. 8A). The opening of shutter 19 in this configuration will produce one encodement mark 32 on fiducial area 17d (as shown in FIG. 6). The film-developing equipment will subsequently interpret the presence of one encodement mark 32 as an indiction that classic-type image 36b should be processed.

Placing lever 41 in the "panoramic" position causes masking element 33 to rotate into a position in which no light-pipe masks 35 are aligned with pipes 29 (FIG. 8B). Thus, two encodement marks 32 will be placed on fiducial areas 17d when shutter 19 is opened (also shown in FIG. 6). This particular marking pattern functions as an indication that panoramic image 36c should be produced from that particular frame.

The outer circumference of masking element 33 comprises two semi-circular sections of differing radii. This shape minimizes the overall dimensions of masking element 33. The relative compactness of element 33, combined with the integration of element 33 around optical axis 21, permits element 33 to fit within a spatial "footprint" that is defined by other components of camera 10, i.e., masking element 33 does not require any increase in the dimensions of camera 10 beyond that required to accommodate the camera's other internally-disposed components.

The integration of masking element 33 around optical axis 21 is particularly advantageous from the standpoint of minimizing the overall dimensions of camera 10. Integrating element 33 in this manner allows picture-taking lens 18 to be positioned at or near the center of camera 10, which facilitates a relatively compact overall layout. The accommodation of lever 41 and gear segment 42 likewise require no increase in the dimensions of camera 10 due to the minimal dimensions of these components, and the integration of both components into cover 11.

The masking element provided by the present invention provides a simple, inexpensive, and compact means for selectively masking the viewfinder and the light pipes of a camera utilized for pseudo-photography. These characteristics make the use of the masking element highly advantageous in low-cost, single-use cameras due to the strict cost and size constraints typically associated with these types of cameras.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed.

What is claimed is:

1. A camera comprising:
   a picture-taking lens having an optical axis;
   a viewfinder;
   a light pipe, said light pipe selectively conveying ambient light to fiducial areas on film in said camera; and
   a masking element rotatably disposed around said optical axis inside said camera, said masking element comprising a viewfinder mask and a light-pipe mask, said viewfinder mask being selectively alignable with said viewfinder by a rotation of said masking element, said viewfinder mask defining a field of view through said viewfinder, said light-pipe mask being selectively alignable with one end of said light pipe by said rotation of said masking element.

2. The camera of claim 1, wherein said camera further comprises a format-selector switch, said switch being coupled to said masking element so that a movement of said switch causes a rotation of said masking element.

3. The camera of claim 2, wherein:
   said masking element further comprises a first gear; and
   said format-selector switch comprises a lever and a second gear, said second gear being coupled to said lever and said first gear so that a movement of said lever causes said rotation of said masking element.

4. The camera of claim 3, wherein said first gear is rotatably disposed around said optical axis of said picture-taking lens.

5. The camera of claim 1, wherein:
said masking element comprises a first, a second, and a third viewfinder mask;
said first mask defines a classic field of view through said viewfinder when said first mask is aligned with said viewfinder;
said second mask defines a panoramic field of view through said viewfinder when said second mask is aligned with said viewfinder; and
said third mask defines a high-vision field of view through said viewfinder when said third mask is aligned with said viewfinder.

6. The camera of claim 5, further comprising a first and a second light pipe, said pipes selectively conveying ambient light to fiducial areas on film in said camera, wherein said masking element further comprises a plurality of light-pipe masks, said light-pipe masks being selectively alignable with one end of said light pipes by said rotation of said masking element.

7. The camera of claim 6, wherein said light-pipe masks are selectively alignable with one end of said light pipes so that said fiducial areas are exposed to:
a first pattern of ambient light when said first viewfinder mask is aligned with said viewfinder, said first pattern being indicative of a classic-format photograph;
a second pattern of ambient light when said second viewfinder mask is aligned with said viewfinder, said second pattern being indicative of a panoramic-format photograph; and
a third pattern of ambient light when said third viewfinder mask is aligned with said viewfinder, said third pattern being indicative of a high-vision-format photograph.

8. The camera of claim 7, wherein said camera further comprises a format-selector switch, said switch being coupled to said masking element so that a movement of said switch causes a rotation of said masking element.

9. The camera of claim 8, wherein:
said masking element further comprises a first gear; and
said format-selector switch comprises a lever and a second gear, said second gear being coupled to said lever and said first gear so that a movement of said lever causes said rotation of said masking element.

10. The camera of claim 9, wherein said first gear is rotatably disposed around said optical axis of said picture-taking lens.

11. The camera of claim 10, further comprising a front cover and a main body, said main body comprising a lens/shutter housing, wherein at least a portion of said masking element is disposed between said front cover and said lens/shutter housing.

12. The camera of claim 11, wherein said lever is disposed on an outer surface of said front cover and said second gear is disposed on an inner surface of said front cover.

13. The camera of claim 12, wherein said masking element further comprises a base.

14. The camera of claim 13, wherein said base is formed from a substantially transparent material and said masks are formed from a substantially opaque material, said opaque material being fixed to said base.

15. The camera of claim 14, wherein said base comprises a surface that defines a circular aperture, said first gear being disposed around a circumference of said aperture.

16. The camera of claim 15, wherein said lens/shutter housing comprises a raised lip, said lip being disposed within said aperture defined by said base.

17. The camera of claim 16, wherein said base comprises an outer circumference, said outer circumference comprising a first section and a second section, said first section having a semi-circular shape and a first radius, said second section having a semi-circular shape and a second radius.

18. The camera of claim 17, further comprising a rear cover, said main body being disposed within said front and rear covers.

19. The camera of claim 18, wherein said main body further comprises a film-cassette compartment and a film-spool compartment, said film-cassette compartment housing said film before said film is exposed to ambient light, said film-spool compartment housing said film after said film is exposed to ambient light.

20. The camera of claim 19, wherein said film comprises an SSU film strip.

21. The camera of claim 18, wherein said main body further comprises a film-cassette compartment and a film-spool compartment, said film being pre-wound in said film-spool compartment.

22. An APS camera comprising:
a picture-taking lens having an optical axis;
a viewfinder;
a first and a second light pipe; and
a masking element rotatably disposed around said optical axis inside said camera, said masking element comprising a first, a second, and a third viewfinder mask and a plurality of light-pipe masks, said viewfinder masks being selectively alignable with said viewfinder by a rotation of said masking element and said light pipes selectively conveying ambient light to fiducial areas on film in said camera, wherein:
said first viewfinder mask defines a classic field of view through said viewfinder when said first viewfinder mask is aligned with said viewfinder;
said second viewfinder mask defines a panoramic field of view through said viewfinder when said second viewfinder mask is aligned with said viewfinder; and
said third viewfinder mask defines a high-vision field of view through said viewfinder when said third viewfinder mask is aligned with said viewfinder.

23. The camera of claim 22, wherein said light-pipe masks are selectively alignable with one end of said light pipes by said rotation of said masking element so that said fiducial areas are exposed to:
a first pattern of ambient light when said first viewfinder mask is aligned with said viewfinder, said first pattern being indicative of a classic-format photograph;
a second pattern of ambient light when said second viewfinder mask is aligned with said viewfinder, said second pattern being indicative of a panoramic-format photograph; and
a third pattern of ambient light when said third viewfinder mask is aligned with said viewfinder, said third pattern being indicative of a high-vision-format photograph.

24. The camera of claim 23, wherein said camera further comprises a format-selector switch, said switch being coupled to said masking element so that a movement of said switch causes a rotation of said masking element.

25. The camera of claim 24, wherein:
said masking element further comprises a first gear, said gear being rotatably disposed around said optical axis of said picture-taking lens; and
said format-selector switch comprises a lever and a second gear, said second gear being coupled to said lever and said first gear so that a movement of said lever causes said rotation of said masking element.

26. The camera of claim 25, further comprising a main body, said main body comprising a film-cassette compartment and a film-spool compartment, said film-cassette compartment housing said film before said film is exposed to ambient light, said film-spool compartment housing said film after said film is exposed to ambient light.

27. The camera of claim 25, further comprising a main body, said main body comprising a film-cassette compartment and a film-spool compartment, said film being pre-wound in said film-spool compartment.

28. The camera of claim 26, further comprising a front cover, wherein said main body further comprises a lens/shutter housing, at least a portion of said masking element being disposed between said front cover and said lens/shutter housing.

29. The camera of claim 28, wherein said lever is disposed on an outer surface of said front cover and said second gear is disposed on an inner surface of said front cover.

30. The camera of claim 29, wherein said masking element further comprises a base, said base comprising a surface that defines a circular aperture, said first gear being disposed around a circumference of said aperture.

31. The camera of claim 30, wherein said lens/shutter housing comprises a raised lip, said lip being disposed within said aperture defined by said base.

32. A single-use camera comprising:

a picture-taking lens having an optical axis;

a viewfinder;

a light pipe, said light pipe selectively conveying ambient light to fiducial areas on film in said camera; and a masking element rotatably disposed around said optical axis inside said camera, said masking element comprising a viewfinder mask and a light-pipe mask, said viewfinder mask being selectively alignable with said viewfinder by a rotation of said masking element, said viewfinder mask defining a field of view through said viewfinder, said light-pipe mask being selectively alignable with one end of said light pipe by said rotation of said masking element.

33. The camera of claim 32, further comprising a main body, said main body comprising a film-cassette compartment and a film-spool compartment, said film being pre-wound in said film-spool compartment.

34. The camera of claim 32, further comprising a front cover, a rear cover, a main body disposed between said front and rear covers, and packaging disposed about an exterior surface of said camera, wherein said main body comprises a film-cassette compartment and a film-spool compartment, said film-cassette compartment housing said film before said film is exposed to ambient light, said film-spool compartment housing said film after said film is exposed to ambient light, said film being disposed in a film cassette when said film is housed within said film-cassette compartment, said film being disposed on a film spool when said film is disposed within said film-spool compartment.

35. The camera of claim 34, wherein said film cannot be replaced in said camera without at least partial removal or partial destruction of said packaging.

36. The camera of claim 34, wherein removal of said rear cover requires at least partial removal or partial destruction of said packaging.

37. The camera of claim 34, wherein said film cassette and said film spool cannot be removed from said camera without at least partial removal or partial destruction of at least one of said packaging, said front or rear covers, or said main body.

38. The camera of claims 35, 36, or 37, wherein:

said masking element comprises a first, a second, and a third viewfinder mask;

said first mask defines a classic field of view through said viewfinder when said first mask is aligned with said viewfinder;

said second mask defines a panoramic field of view through said viewfinder when said second mask is aligned with said viewfinder; and said third mask defines a high-vision field of view through said viewfinder when said third mask is aligned with said viewfinder.

39. The camera of claim 38, further comprising a plurality of said light pipes, said light pipes selectively conveying ambient light to said fiducial areas on said film in said camera, wherein said masking element further comprises a plurality of said light-pipe masks, said light-pipe masks being selectively alignable with one end of said light pipes by said rotation of said masking element so that said fiducial areas are exposed to:

a first pattern of ambient light when said first viewfinder mask is aligned with said viewfinder, said first pattern being indicative of a classic-format photograph;

a second pattern of ambient light when said second viewfinder mask is aligned with said viewfinder, said second pattern being indicative of a panoramic-format photograph; and a third pattern of ambient light when said third viewfinder mask is aligned with said viewfinder, said third pattern being indicative of a high-vision-format photograph.

40. The camera of claim 39, wherein said camera is an APS camera.

41. The camera of claim 40, wherein said camera further comprises a format-selector switch, said switch being coupled to said masking element so that a movement of said switch causes a rotation of said masking element.

42. The camera of claim 41, wherein:

said masking element further comprises a first gear, said gear being rotatably disposed around said optical axis of said picture-taking lens; and said format-selector switch comprises a lever and a second gear, said second gear being coupled to said lever and said first gear so that a movement of said lever causes said rotation of said masking element.

43. The camera of claim 42, wherein said main body further comprises a lens/shutter housing, at least a portion of said masking element being disposed between said front cover and said lens/shutter housing.

44. The camera of claim 43, wherein said lever is disposed on an outer surface of said front cover and said second gear is disposed on an inner surface of said front cover.

45. The camera of claim 44, wherein said masking element further comprises a base, said base comprising a surface that defines a circular aperture, said first gear being disposed around a circumference of said aperture.

46. The camera of claim 45, wherein said lens/shutter housing comprises a raised lip, said lip being disposed within said aperture defined by said base.

47. The camera of claim 46, wherein said base is formed from a substantially transparent material and said masks are formed from a substantially opaque material, said opaque material being fixed to said base.

48. A camera comprising:

a picture-taking lens having an optical axis;

a viewfinder;

a masking element rotatably disposed around said optical axis inside said camera, said masking element comprising a viewfinder mask and a first gear, said viewfinder mask being selectively alignable with said viewfinder by a rotation of said masking element, said viewfinder mask defining a field of view through said viewfinder; and a format-selector switch comprising a lever and a second gear, said second gear being coupled to said lever and said first gear so that a movement of said lever causes said rotation of said masking element.

49. The camera of claim 48, wherein said first gear is rotatably disposed around said optical axis of said picture-taking lens.

* * * * *